(12) United States Patent
Buchinger et al.

(10) Patent No.: US 8,722,262 B2
(45) Date of Patent: May 13, 2014

(54) METHOD AND APPARATUS FOR DISCHARGING USED OPERATING MEDIA OF A FUEL CELL SOME OF WHICH ARE EXPLOSIVE

(75) Inventors: Martin Buchinger, Bachmanning (AT); Mario Krumphuber, Sipbachzell (AT); Werner Rumpl, Weisskirchen (AT); Thomas Schmitsberger, Lambach (AT); Ewald Wahlmueller, Linz (AT)

(73) Assignee: Fronius International GmbH, Pettenbach (AT)

( * ) Notice: Subject to any disclaimer, the term of this patent is extended or adjusted under 35 U.S.C. 154(b) by 371 days.

(21) Appl. No.: 12/998,837

(22) PCT Filed: Dec. 23, 2009

(86) PCT No.: PCT/AT2009/000496
§ 371 (c)(1),
(2), (4) Date: Jun. 8, 2011

(87) PCT Pub. No.: WO2010/075602
PCT Pub. Date: Jul. 8, 2010

(65) Prior Publication Data
US 2011/0236778 A1   Sep. 29, 2011

(30) Foreign Application Priority Data
Dec. 30, 2008 (AT) .............................. A 2027/2008

(51) Int. Cl.
*H01M 8/04* (2006.01)
(52) U.S. Cl.
CPC ...... *H01M 8/04716* (2013.01); *H01M 8/04805* (2013.01); *H01M 8/04843* (2013.01)
USPC ............ 429/427; 429/408; 429/400; 429/428

(58) Field of Classification Search
None
See application file for complete search history.

(56) References Cited

U.S. PATENT DOCUMENTS 6,852,435 B2 *   2/2005   Vuk et al. ...................... 429/439
7,371,477 B2     5/2008   Yamamoto et al.
(Continued)

FOREIGN PATENT DOCUMENTS

DE        100 31 238        2/2002
DE    10 2008 016 579       10/2009
(Continued)

OTHER PUBLICATIONS

International Search Report of PCT/AT2009/000496, Mar. 26, 2010.
(Continued)

*Primary Examiner* — Milton I Cano
*Assistant Examiner* — Wojciech Haske
(74) *Attorney, Agent, or Firm* — Collard & Roe, P.C.

(57) ABSTRACT

The invention relates to a method and to a device for discharging used operating media of a fuel cell (1) in a fuel cell system (20), at least some of which are explosive, comprising a sensor unit (30) for examining the operating media discharged from an operating space (27). In order to discharge the used operating media from the fuel cell system independently of the operation of the fuel cell system and taking safety regulations into account, a mixing zone (32) is provided for mixing the operating media with a scavenging medium (28) to obtain waste air (33), wherein the operating space (27) is closed by a fan (29), and the sensor unit (30) is disposed downstream of the mixing zone (32), viewed in the flow direction of the waste air (33).

8 Claims, 4 Drawing Sheets

(56) References Cited

U.S. PATENT DOCUMENTS

Figure 1:
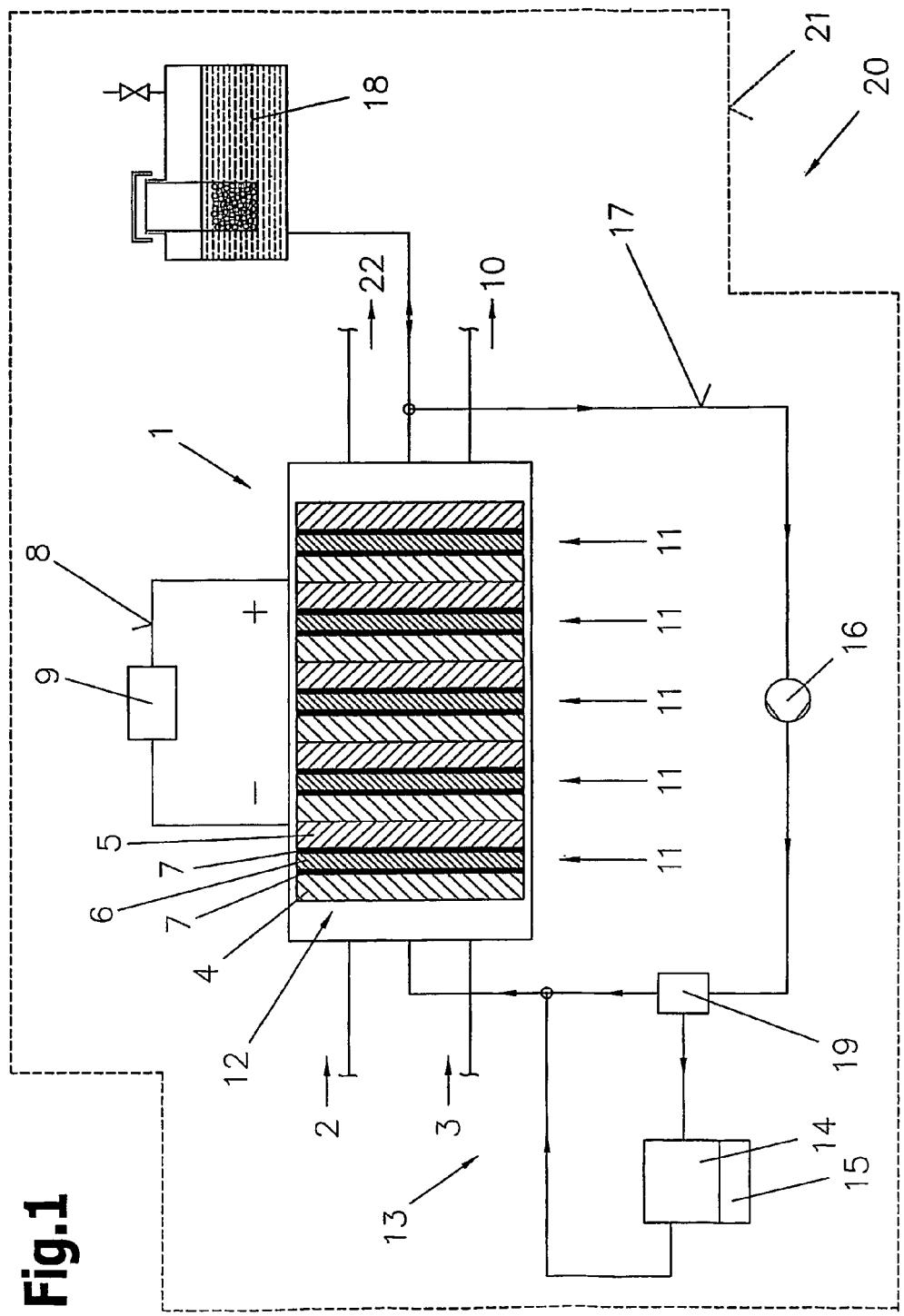

2007/0087241 A1    4/2007    Mulvenna et al.
2008/0156549 A1    7/2008    Leboe et al.
2011/0045369 A1    2/2011    Nuessle

FOREIGN PATENT DOCUMENTS

| | | |
|---|---|---|
| EP | 1 416 567 | 5/2004 |
| JP | 08-031436 | 2/1996 |
| JP | 09-223510 | 8/1997 |
| JP | 10-074531 | 3/1998 |
| JP | 2003-007323 | 1/2003 |
| JP | 2003-132916 | 5/2003 |
| JP | 2004-127749 | 4/2004 |
| JP | 2004-259491 | 9/2004 |
| JP | 2004-356017 | 12/2004 |
| JP | 2005-044736 | 2/2005 |
| JP | 2006-253020 | 9/2006 |
| JP | 2007-087692 | 4/2007 |
| WO | WO 99/57335 | 11/1999 |
| WO | WO 2005/041336 | 5/2005 |

OTHER PUBLICATIONS

Austrian Office Action dated Dec. 14, 2009 in A 2027/2008 with English translation of relevant parts.

Japanese Office Action dated Mar. 12, 2013 in Japanese Application No. 2011-543948 with English translation.

Chinese Office Action dated Apr. 26, 2013 in Chinese Application No. 200980153303.4 with English translation of relevant part.

* cited by examiner

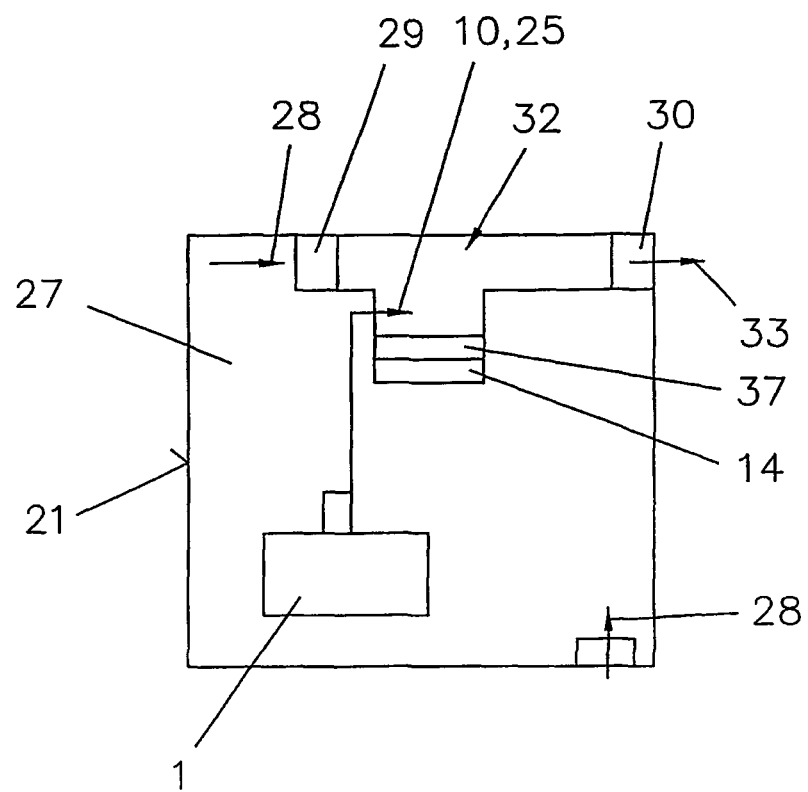

METHOD AND APPARATUS FOR DISCHARGING USED OPERATING MEDIA OF A FUEL CELL SOME OF WHICH ARE EXPLOSIVE

CROSS REFERENCE TO RELATED APPLICATIONS

This application is the National Stage of PCT/AT2009/000496 filed on Dec. 23, 2009, which claims priority under 35 U.S.C. §119 of Austrian Application No. A 2027/2008 filed on Dec. 30, 2008, the disclosure of which is incorporated by reference. The international application under PCT article 21(2) was not published in English.

The invention relates to a method for discharging used operating media of a fuel cell in a fuel cell system, at least some of which are explosive, wherein the operating media of an operating space of the fuel cell system are examined for explosiveness by a sensor unit prior to being discharged.

The invention also relates to an apparatus for discharging used operating media of a fuel cell in a fuel cell system, at least some of which are explosive, comprising a sensor unit for examining the operating media discharged from an operating space for explosiveness.

DE 100 31 238 A1 discloses that a fuel cell system is scavenged with a scavenging medium, so that the fuel cell system is ventilated. This is effected by an explosion-proof fan. Thus, it is possible to avoid accumulations, of hydrogen which may, for instance, occur due to leakages. Such accumulations are preferably detected by the arrangement of hydrogen sensors.

It is of disadvantage that the fuel cell system is only scavenged and an increase of the hydrogen content is detected. Thus, it is only possible to detect leakages of the fuel cell system which increase the explosiveness of the scavenging medium. This is, however, not the case with a normal operation of the fuel cell system. It is, however, at least with the normal operation of the fuel cell system with a PEM (Polymer Electrolyte Membrane) fuel cell, necessary to discharge explosive hydrogen portions to the environment. For observing safety regulations, additional means are necessary.

EP 1 416 567 B1 discloses an exhaust gas processing device for a fuel cell, wherein an anode line for the hydrogen discharged from the fuel cell is conducted into a diluter in which the hydrogen is mixed with portions of the operating gas air. The mixture is discharged with the flow of the cathode waste gas via a sensor.

It is of disadvantage that the flow of the cathode waste gas is in direct relation with the operation of the fuel cell system, so that it cannot be controlled independently of the fuel cell system.

It is an object of the invention to discharge the explosive portions of the operating media, which are formed during the operation of the fuel cell and are to be discharged, from the fuel cell system independently of the operation of the fuel cell system, taking safety regulations into account. Disadvantages of known methods and apparatuses are to be avoided or at least reduced.

With respect to the method, the object of the invention is solved in that the discharging is performed by a fan positioned between the operating space and a mixing zone, and that a scavenging medium is sucked by the fan through the operating space for ventilation, said scavenging medium being mixed with the operating media in the mixing zone to obtain waste air prior to discharging, and this waste air is discharged from the mixing zone. It is of advantage that the discharging of the operating gases is independent of the operation of the fuel cell system since the fan has no direct influence on the operation of the fuel cell system. The method is very easy to perform. Thus, the operating media are mixed with the scavenging medium prior to the discharging from the fuel cell system and are discharged jointly. By this, the explosiveness of the operating media is reduced prior to the examination by the sensor unit to such an extent that they may be discharged from the fuel cell system without danger and in a controlled manner. During a normal operation of the fuel cell system it is possible to keep the explosiveness permanently below a limit value. Thus, it is possible to continuously supply measurement results, so that it is possible to detect danger due to modified measurement results in a very reliable manner. It is, however, also advantageous that the fan is operated and/or arranged such that the operating space is positioned on the suction side of the fan. Thus, it is possible to detect and/or monitor hydrogen leakages in the operating space, such as, for instance, membrane leakages, by means of the sensor unit, since a joint discharge is performed. Likewise, it is possible to switch the fuel cell system into a safe condition by that. By the fact that the mixing zone is positioned on the pressure side of the fan and the fan hence separates the operating space from the mixing zone, the operating space does not contain any explosive portions in normal operation and is simultaneously ventilated by the scavenging medium. Advantageously, the fan is not exposed to the cathode waste air that is at least partially condensing and is rather hot, so that it is strained less and its lifetime is correspondingly prolonged. The performance of the fan may also be kept low since the flow of the cathode waste air also contributes to the discharge of the waste air where required.

The flow of the waste air is preferably determined by the flow of the scavenging medium controlled by the fan. Thus, it is possible to influence the mixing of the operating media with the scavenging medium by changing the flow of the scavenging medium, in particular the flow volume.

Advantageously, the fan is controlled as a function of the explosiveness of the waste air.

The used operating media are formed at least from a gaseous portion of a cathode waste air and an explosive gaseous portion of an anode mixture.

If the explosive and gaseous portion of the anode mixture of the fuel cell is mixed in the mixing zone with the scavenging medium and the cathode waste air to obtain waste air, a two-fold reduction of the explosiveness is given by dilution with the scavenging medium, on the one hand, and by minimizing of the oxygen content by the cathode waste air, on the other hand. Likewise, the humidity content in the cathode waste air counteracts the explosiveness of the mixture.

If the control of the fan is adapted by a periodic addition of the anode mixture in the mixing zone, it is possible to keep the explosiveness of the discharged waste air substantially constant in normal operation, since the increase of the explosiveness is compensated with the periodic addition of the anode mixture.

In order to be able to examine the function of the fan, the flow of the scavenging medium may be measured.

Advantageously, a value of the explosiveness of the discharged waste air is referred to for placing the fuel cell system into operation.

In accordance with a further feature of the invention it is provided that a liquid portion of the used operating medium is, in or upstream of the mixing zone, separated from the gaseous portion of the used operating media by a separator, and that the gaseous portions are discharged independently of the operation of the fuel cell system.

In so doing, a pre-mixture may be performed with the used operating media in the separator positioned upstream of the mixing zone, and the pre-mixed used operating media may be conducted into the mixing zone.

If a liquid portion of the operating media in the mixing zone is passed over a cooler with a thermally monitored evaporation means and is evaporated, it is possible to discharge the liquid portion jointly with the gaseous portion from the fuel cell.

The object of the invention is also solved by an above-mentioned apparatus for discharging used operating media of a fuel cell in a fuel cell system, at least some of which are explosive, wherein a mixing zone is provided for mixing the operating media with a scavenging medium to obtain waste air, wherein the operating space is closed by a fan and the sensor unit is disposed downstream of the mixing zone, viewed in the flow direction of the waste air. The advantages of such an apparatus may be taken from the above description of the advantages of the method.

The mixing zone is preferably positioned in a channel, wherein the fan is mounted at one end of the channel which is designed as an outlet of the operating space, and a second end of the channel is designed for discharging the waste air.

In accordance with a further embodiment of the apparatus according to the invention, a cooler with thermally monitored evaporation means is positioned between the mixing zone and the sensor unit.

Figure 2:
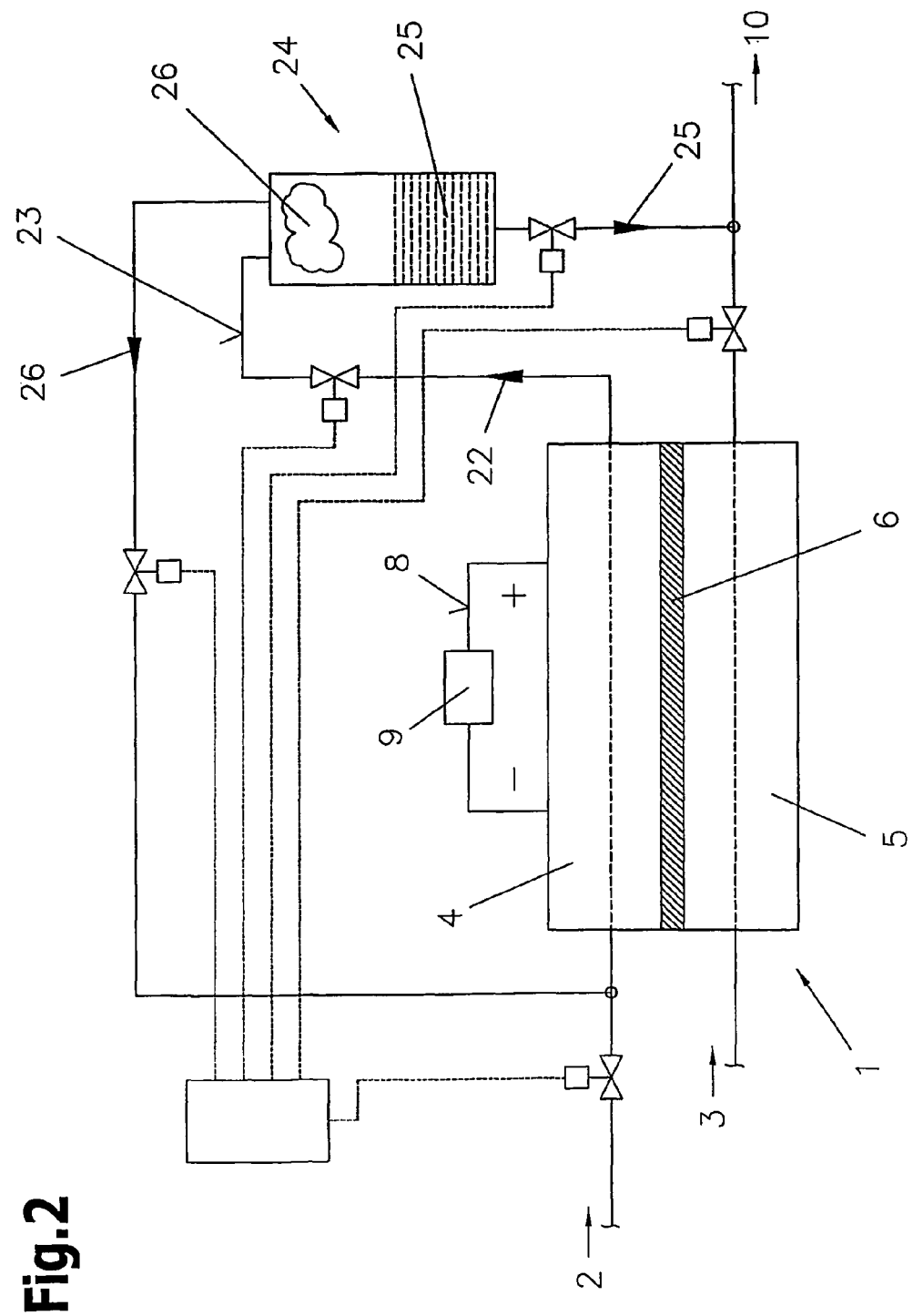
Figure 3:
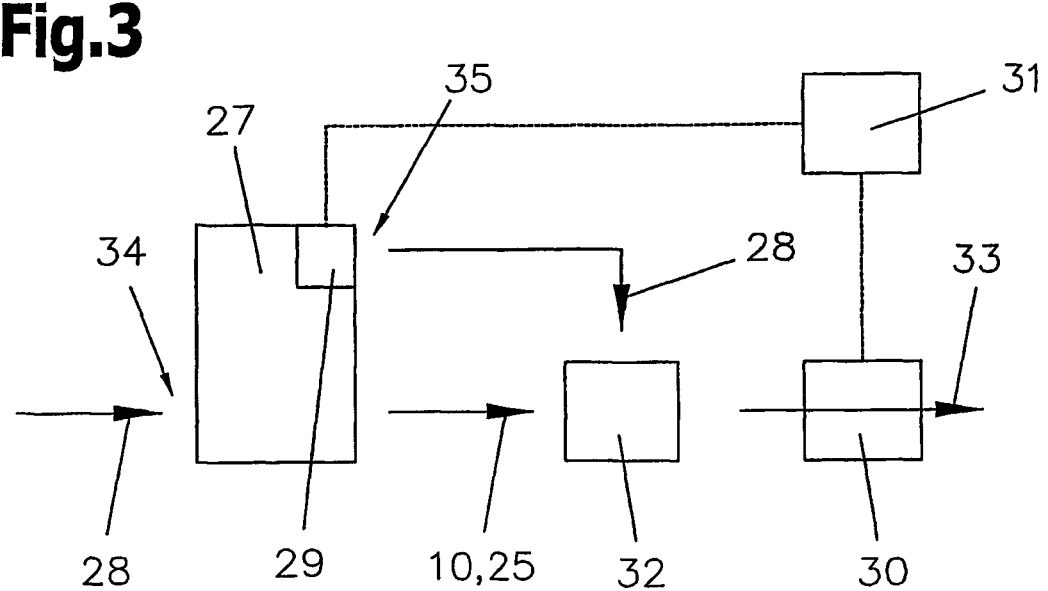
Figure 4:
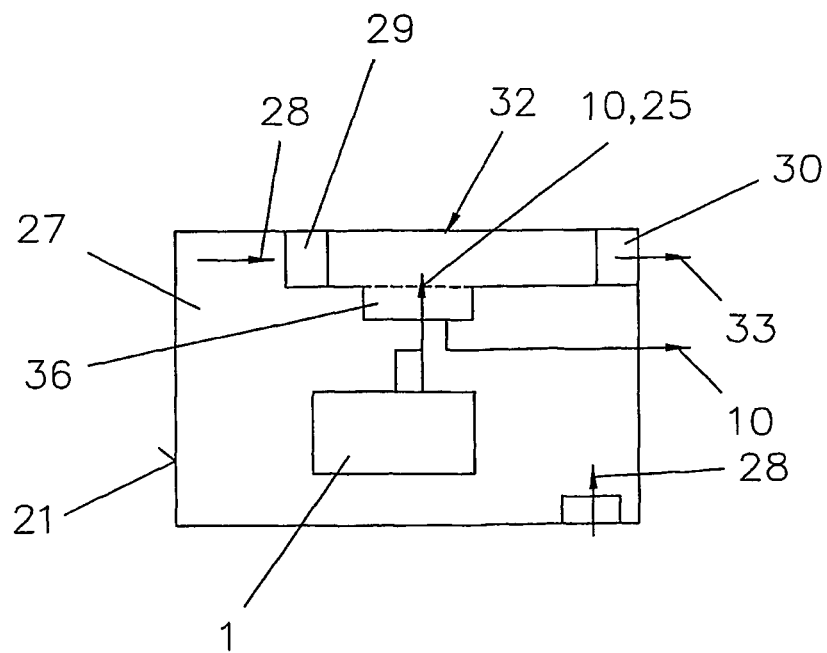

The present invention will be explained in more detail by means of the enclosed, schematic drawings. There show:

FIG. 1 the schematic structure of a fuel cell system;

FIG. 2 the discharging of the used operating media, illustrated schematically;

FIG. 3 the principle of the discharging of used operating media of a fuel cell in accordance with the invention, illustrated schematically;

FIG. 4 a first embodiment of the discharging in accordance with the invention, illustrated schematically; and FIG. 5 a second embodiment of the discharging in accordance with the invention, illustrated schematically.

To begin with, it is noted that equal elements of the embodiments are provided with equal reference numbers.

FIG. 1 illustrates a fuel cell 1 for generating current from hydrogen 2 and oxygen 3 or air 3, respectively. In general, fuel cells 1 are electro-chemical current generators generating current directly from a chemical reaction. This is effected by an inversion of the electrolytic decomposition of the water in which the gases hydrogen 2 and oxygen 3 are formed by a current flow. In the fuel cell 1, the operating media hydrogen 2 and oxygen 3 thus react with one another, so that current is generated. To this end, the hydrogen 2 is supplied at an anode 4 and the oxygen 3 is supplied at a cathode 5, wherein the anode 4 and the cathode 5 are separated by an electrolyte 6. Furthermore, the anode 4 and the cathode 5 are coated with a catalyst 7, usually of platinum, at the sides facing the electrolyte 6. By this it is possible for the hydrogen 2 to react with the oxygen 3, wherein this is performed in two separate individual reactions at the two electrodes, the anode 4 and the cathode 5.

At the anode 4, the hydrogen 2 is supplied, wherein the hydrogen 2 reacts at the catalyst 7 and one hydrogen molecule each splits into two hydrogen atoms. A hydrogen atom comprises two components, a negatively charged electron and a positively charged proton. During the reaction each hydrogen atom yields its electron. The positively charged protons diffuse through the electrolyte 6, which is impermeable for the negatively charged electrons, to the cathode 5.

At the cathode 5, oxygen 3 or oxygen molecules, respectively, is/are supplied at the same time as the hydrogen 2 is supplied at the anode 4. The oxygen molecules react at the catalyst 7 and split up into two oxygen atoms each, which deposit at the cathode 5.

Thus, the positively charged protons of the hydrogen 2 and the oxygen atoms deposit at the cathode 5, and the negatively charged electrons of the hydrogen 2 deposit at the anode 4. By that, a so-called lack of electrons prevails at the cathode 5, and a so-called electron surplus at the anode 4. The anode 4 thus corresponds to a negative pole (−) and the cathode 5 to a positive pole (+). If the two electrodes, i.e. the anode 4 and the cathode 5, are connected with an electrical conductor 8, the electrons migrate, due to the potential difference, across the electrical conductor 8 from the anode 4 to the cathode 5. Thus, there flows electric current or direct current, respectively, that may be supplied to a consumer 9 provided in the line 8. The consumer 9 may, for instance, be formed by a battery storing the current generated, or an inverter converting the direct current generated into alternating current.

Two electrons that have migrated across the electrical conductor 8 from the anode 4 to the cathode 5 are each absorbed by an oxygen atom in the cathode 5 and become two-fold negatively charged oxygen ions. These oxygen ions unite to form water 10 with the positively charged protons of the hydrogen 2 which have diffused through the electrolyte 6 from the anode 4 to the cathode 5. The water 10 is discharged from the cathode 5 as a so-called reaction end product.

In a cell 11 of the fuel cell 1, the reaction gases hydrogen 2 and oxygen 3 thus react with one another, so that current is generated. A cell 11 is formed by the anode 4, the cathode 5, the electrolyte 6, and the catalyst 7. If a plurality of cells 11 are connected with each other in series, such a structure is generally referred to as a stack 12. Accordingly, the stack 12 generates current during the operation of the fuel cell 1.

The reactions of hydrogen 2 with oxygen 3 in the individual cells 11 of the stack 12 produce heat that has to be discharged. This is performed via a cooling system 13 consisting in the simplest form of a cooler 14, a fan 15, and a pump 16 in a cooling circuit 17. The pump 16 pumps a coolant 18 available in the cooling circuit 17 and in a compensation tank through the stack 12 of the fuel cell 1, for instance, in the direction of the arrows. The coolant 18 withdraws the heat from the stack 12 and absorbs it. The cooler 14 in the cooling circuit 17 which is cooled by the fan 15 in turn withdraws the heat from the coolant 18 and gives it off to the environment, so that the coolant 18 is again adapted to withdraw the heat from the stack 12. The cooling circuit 17 may also be regulated such that the coolant 18 flows through the cooler 14 only if the coolant 18 has a certain temperature. This regulation is performed accordingly by a thermostat 19.

Such a fuel cell system 20 may be arranged in a housing 21. In real operation of the fuel cell 1, the hydrogen 2 flowing into the anode 4 can, however, not be consumed completely since oxygen 3—in fact usually air with corresponding inert gases (such as nitrogen, argon, and carbon dioxide)—diffuses from the cathode 5 through the electrolyte 6 or the electrolyte membrane 6, respectively, to the anode 4 and reacts therewith the hydrogen 2 to form water 10. This is mainly effected by concentration and pressure gradients between the anode 4 and the cathode 5, and by a very small layer thickness (<100 μm) of the electrolyte membranes 6 used. Accordingly, the hydrogen 2 also diffuses through the membrane 6 to the cathode 5, and water 10 is formed. Basically, the water 10 produced in the anode 4 and the cathode 5 serves for their moisturising. However, since the water 10 is continuously produced by the reaction of hydrogen 2 and oxygen 3, it accumulates in the electrodes and decreases the voltage of the cell 11. Therefore it is necessary to remove or discharge, respectively, the water 10 from the electrodes.

The discharging from the anode 4 is performed such that the mixture 22 of water 10, the inert gases, and part of the hydrogen 2 is conveyed, via a discharge 23, into a reservoir 24, as illustrated in the following in FIG. 2. In the reservoir 24, the water 10 and part of the inert gases, a liquid condensate 25, accumulate at the bottom, and the remaining portion of the inert gases as well as the hydrogen 2, as a gas portion 26, accumulate in the upper region. The hydrogen 2 or the gas portion 26, respectively, may be returned from the reservoir 24 to the anode 4 of the fuel cell 1. The condensate 25 is, however, like the water 10 from the cathode 5, discharged from the fuel cell system 20. In so doing, at least parts of the gas portion 26 are also discharged along with the condensate 25. From the cathode 5, however, a so-called cathode waste air that is formed during the reaction of hydrogen 2 with air is also discharged with the water 10. These used operating media, at least some of which are explosive, have to be discharged safely from the fuel cell system, so that there is no more danger of explosion. The returning and discharging is basically performed by control units that are controlled by control means.

Part of the fuel cell system 20 is formed by an operating space 27, as illustrated in FIGS. 3 to 5. The operating space 27 accommodates those components that process the explosive portions of the operating media and discharge the used operating media. These components are in particular the stack 12, the reservoir 24, and the cooling system 13.

In accordance with the invention, there is provided that the explosive portions of the used operating media are, prior to being discharged, mixed by means of a fan 29 in a mixing zone 32, so that waste air 33 is obtained, wherein the value of the explosiveness of the waste air 33 is kept below a limit value. The mixing zone 32 is separated from the operating space 27 by the fan 29. In order that no accumulations of explosive portions of the used operating media occur in this operating space 27, for instance, by leakages, the operating space 27 is scavenged with a scavenging medium 28. To this end, the scavenging medium 28 is sucked in by the fan 29 and blown off or discharged by the fan 29 to the mixing zone 32, so that the waste air 33 can be mixed—as will be described in detail later. Subsequently, the waste air 33 is blown out of the fuel cell system 20 by the fan 29 via a sensor unit 30. The sensor unit 30 is positioned downstream of the fan 29—i.e. at the pressure side thereof—and examines the discharged waste air 33 for explosiveness. If this is exceeded, a control device 31 may, based on the information of the sensor unit 30, for instance, switch off the fuel cell system or induce steps for reducing explosiveness. The fan 29 is preferably designed explosion-proof.

FIG. 3 schematically illustrates the method in accordance with the invention, according to which the scavenging medium 28 is mixed with the used operating media, at least some of which are explosive, to obtain waste air 33. The operating space 27 comprises an inlet 34 and an outlet 35 for the scavenging medium 28. The fan 29 is positioned in the outlet 35 of the operating space 27, so that the scavenging medium 28 is sucked in at the inlet 34 and blown out at the outlet 35. Preferably, the inlet 34 and the outlet 35 are arranged such that the operating space 27 is adapted to be scavenged or ventilated, respectively, substantially completely with the scavenging medium 28. This may, for instance, be implemented by a diagonal arrangement. It is essential that the fan 29 constitutes a closure of the operating space 27, so that the scavenging medium 28 blown out by the fan 29 cannot return into the operating space 27. The operating space 27 thus forms an enclosed air space that is separated from the other side of the fan 29 by same. Thus, the scavenging medium 28 is adapted, if necessary, to also discharge oxyhydrogen that is formed during the charging of batteries. The compensation tank of the cooling system 13 may also be scavenged or ventilated, respectively, with the scavenging medium 28, so that the gaseous and possibly explosive portions produced therein by diffusion can be discharged safely. During the scavenging of the operating space 27, in particular small gaseous portions of the used operating media which are explosive and may occur by diffusion at mechanical joints are absorbed by the scavenging medium 28 and diluted sufficiently. Thus, the scavenging medium 28 enriched with explosive portions does not constitute any danger in normal operation. Also discharged from the operating space 27 is the condensate 25—which comprises a share of the gas portion 26—from the reservoir 24 and the water 10 with the cathode waste air from the cathode 5. The condensate 25 is discharged from the reservoir 24 substantially periodically while the water 10 with the cathode waste air is discharged substantially continuously.

In accordance with the invention, the scavenging medium 28, the condensate 25, and the water 10 with the cathode waste air are conducted into the mixing zone 32 and mixed with one another. Thus, in a normal operation of the fuel cell system 20, a mixing ratio between explosive portions, the scavenging medium 28, the condensate 25, and the cathode waste air is guaranteed, so that a limit value for the explosiveness is not exceeded. The efficiency of the mixture is substantially achieved in that the scavenging medium 28 is conducted into the mixing zone 32 from some other side than the condensate 25. Basically, the mixing may, however, also be influenced by the way the scavenging medium 28 or the used operating media, respectively, are conducted into the mixing zone 32—for instance, by a particular order. Thus, it is possible to initially conduct the scavenging medium 28, then the condensate 25, and finally the cathode waste air into the mixing zone 32. Consequently, the mixing with the cathode waste air that is poor of oxygen takes place again in particular at the outlet of the mixing zone 32. The gaseous portions—i.e. the scavenging medium 28 and the gas portion 26 of the condensate 25—contain explosive portions, wherein the cathode waste air is poor of oxygen. Thus, it is achieved by the mixing that the explosive portions of the used operating media contained therein are, in particular by the cathode waste air that is poor of oxygen, reduced such that the waste air 33 formed in the mixing zone 32 can be discharged from or blown off, respectively, the fuel cell system 20 at least partially by the pressure of the fan 29 without any further measures.

In the normal operation of the fuel cell 1, the highest share of explosive portions is present in the gas portion 26 of the condensate 25. In addition, the explosive share of the condensate 25 is increased periodically during the so-called "purging", which is conducted correspondingly into the mixing zone 32, so that the limit value of the explosiveness in the mixing zone 32 is possibly exceeded in this process. In accordance with the invention, however, the explosive portions are first of all mixed with the waste air 33 in the mixing zone 32 and their explosiveness is thus decreased, before they are discharged from the fuel cell system 20. The mixing zone 32 may also be considered as a buffer by which an increase of the explosiveness is compensated. This behaviour of the mixing zone 32 results substantially from the fact that turbulences occur in the mixing zone 32, due to which the waste air 33 is mixed and subsequently discharged. During the discharging of the waste air 33, it is conducted past the sensor unit 30 that is adapted to examine the explosiveness of the waste air 33. This is necessary for safety measures such as, for instance, explosion protection. The sensor unit 30 transmits the values measured for explosiveness to the control device 31 that performs the appropriate steps—for instance, the switching to a "safe condition" or the switching-off—if the limit value of explosiveness is exceeded. Likewise, the control device 31 is also adapted to control the fan 29 such that the volume or the flow velocity, respectively, of the scavenging medium 28 is increased, so that the required mixing ratio is again guaranteed to keep the value of explosiveness of the waste air 33 correspondingly low.

The method according to the invention also enables the explosiveness of the discharged waste air 33 to be constantly kept below the limit value by the mixing in the mixing zone 32 in the normal operation of the fuel cell system 20. The normal operation is substantially defined such that the fuel cell 1 produces current and no leakages exist.

In the mixing zone 32, the gaseous waste air 33 is thus produced by mixing, which can be discharged without danger and without additional measures, such as a combustion, from the fuel cell system 20.

In the mixing zone 32, liquid shares are also available due to the condensate 25 and the water 10, which may be discharged by means of two different methods that will be described in the following.

In the first method according to FIG. 4, a separator 36 is integrated in the mixing zone 32, said separator 26 discharging the liquid shares directly from the mixing zone 32 from the fuel cell system 20. Since the liquid shares are heavier than the gaseous ones, they accumulate in the lower region of the mixing zone 32. There, the separator 36 is positioned appropriately, so that the liquid shares, as symbolized by the water 10, can be discharged. During the discharging of these liquid shares, substantially no safety measures with respect to explosiveness are required since the explosive shares are negligibly small. It is to be understood that here it is also possible to position the separator 36 already upstream of the mixing zone 32, so that only the gaseous portions get into the mixing zone 32. This may be performed by a pressurized separator 36, so that the gas portion 26 of the condensate 25 is mixed with the cathode waste air in the separator 36 already. In this case, this is called pre-mixing. To this end, the mixing zone 32 may, for instance, be designed such that it is integrated in a channel or tube. The fan 29 is, for instance, positioned at one end of the tube—which constitutes the outlet 45—, and the scavenging medium 28 sucked in by the fuel cell system 20 is blown out of or discharged from the fuel cell system 20 through the other end of the tube. The mixing zone 32 is substantially positioned directly after the fan 29 and thus forms substantially a section of the tube, so that the gaseous shares are mixed with the continuous flow of the scavenging medium 28 and are blown out via the sensor unit 30.

The second method according to FIG. 5 makes use of the cooler 14 of the fuel cell 1 for discharging the liquid shares, said cooler 14 being designed with a thermally monitored evaporation device 37. The liquid shares from the mixing zone 32 are conducted to this evaporation device 37 and evaporated there. The evaporation is effected due to the temperature of the cooler 14 which is achieved by the cooling of the stack 12 in the cooling system 14. Thus, the liquid shares become vaporous and can be discharged with the gaseous shares from the mixing zone 32 via the sensor unit 30. Accordingly, the gaseous and the liquid shares may be conducted simultaneously from the mixing zone 32 to the evaporation device 37, and the gaseous shares may be discharged from the mixing zone 32 automatically via the sensor unit 30. Additionally, a further mixing of the vaporous shares with the waste air 33 takes place before the discharging via the sensor unit 30 is performed.

It is noted in general that the direction of flow is substantially predetermined by the fan 29. This may, however, be supported additionally by the direction of flow of the cathode waste air. Merely the discharging from the reservoir 24 is independent thereof since this is preferably performed via a pressure control. Basically, the fan 15 of the cooler 14 may also assume the function of the explosion-proof fan 29. Thus, the fan 15 would be sufficient for the fuel cell system 20. At the inlet 34 of the operating space 27, a measurement device may be arranged which measures the quantity of the scavenging medium 28 flowing through. Such a measurement ensures that the fuel cell system 20 is actually scavenged, so that no dangerous accumulations of explosive portions may occur. To this end, the measurement device is appropriately connected with the control device 31. Thus, an early detection and prevention of the danger of accumulations of explosive portions is possible. This measurement value may be referred to as an additional condition for a procedure for placing the fuel cell system 20 into operation which is generally known from prior art, so that definitely no explosive portions are discharged. The sensor unit 30 preferably comprises a hydrogen sensor since the operating medium hydrogen 2 constitutes the most dangerous source. In this case, the sensor of the sensor unit 30 is adapted to the operating media of the fuel cell 1.

The blown-out waste air 33 is preferably conducted such that it cannot get to the inlet 34 of the scavenging medium 28, which may also be monitored by the measurement device at the inlet 34. The scavenging medium 28 may be the medium of a fresh air supply for which, in most cases, the ambient air is used. In so doing, the scavenging medium 28 may also be filtered appropriately.

Basically, the fuel cell system 20 is no longer in the normal condition if a defect such as, for instance, too high temperature of the cooling system 13 or of the process, leakage, defective valves (purging), a defective stack 12, or the like occurs. Such situations are detected by the sensor unit 30. For instance, it is also possible to detect an upward trend of explosiveness if the explosiveness of the waste air 33 increases continuously.

The invention claimed is:

1. A method for discharging used operating media of a fuel cell in a fuel cell system, at least some of which are explosive, wherein the operating media from an operating space of the fuel cell system are examined for explosiveness by a sensor unit prior to discharging,
wherein the discharging is performed by a fan positioned between the operating space and a mixing zone,
wherein a scavenging medium is sucked by the fan through the operating space for ventilation, said scavenging medium being mixed prior to discharging with the operating media in the mixing zone to obtain waste air,
wherein this waste air is discharged from the mixing zone, and
wherein a liquid portion of the operating media is conducted in the mixing zone across a cooler with a thermally monitored evaporation device and is evaporated.

2. The method according to claim 1, wherein the flow of the waste air is determined by the flow of the scavenging medium controlled by the fan.

3. The method according to claim 1, wherein the fan is controlled as a function of the explosiveness of the waste air.

4. The method according to claim 1, wherein at least a gaseous portion of a cathode waste air and an explosive, gaseous portion of an anode mixture form used operating media.

5. The method according to claim 4, wherein the explosive and gaseous portion of the anode mixture is mixed in the mixing zone with the scavenging medium and the cathode waste air to obtain the waste air.

6. The method according to claim 4, wherein the control of the fan is adapted with a periodic addition of the anode mixture in the mixing zone.

7. The method according to claim 1, wherein the flow of the scavenging medium is measured.

8. The method according to claim 1, wherein a value of the explosiveness of the discharged waste air is referred to for placing the fuel cell system into operation.

* * * * *